US010740534B1

(12) United States Patent
Andrusenko

(10) Patent No.: US 10,740,534 B1
(45) Date of Patent: Aug. 11, 2020

(54) AMBIGUOUS DATE RESOLUTION FOR ELECTRONIC COMMUNICATION DOCUMENTS

(71) Applicant: RELATIVITY ODA LLC, Chicago, IL (US)

(72) Inventor: Vladyslav Andrusenko, Kharkov (UA)

(73) Assignee: RELATIVITY ODA LLC, Chicago, IL (US)

( * ) Notice: Subject to any disclaimer, the term of this patent is extended or adjusted under 35 U.S.C. 154(b) by 0 days.

(21) Appl. No.: 16/368,673

(22) Filed: Mar. 28, 2019

(51) Int. Cl.
| G06F 16/00 | (2019.01) |
| G06F 40/103 | (2020.01) |
| G06F 16/93 | (2019.01) |
| G06F 40/123 | (2020.01) |
| G06F 40/205 | (2020.01) |
| G06F 40/258 | (2020.01) |

(52) U.S. Cl.
CPC ............ *G06F 40/103* (2020.01); *G06F 16/93* (2019.01); *G06F 40/123* (2020.01); *G06F 40/205* (2020.01); *G06F 40/258* (2020.01)

(58) Field of Classification Search
CPC ...................................................... G06F 16/93
See application file for complete search history.

(56) References Cited

U.S. PATENT DOCUMENTS

| 8,239,350 B1 | 8/2012 | Vespe et al. |
| 8,375,099 B2 | 2/2013 | Carroll et al. |
| 9,213,688 B2 | 12/2015 | Hoffmann |
| 9,535,904 B2 | 1/2017 | Prokofyev et al. |
| 9,923,931 B1* | 3/2018 | Wagster .................. H04L 63/30 |
| 10,158,900 B1 | 12/2018 | Siddiq et al. |
| 10,459,962 B1* | 10/2019 | Jayaraman .............. G06F 40/20 |
| 2004/0039786 A1* | 2/2004 | Horvitz ................ G05B 19/404 |
| | | 709/207 |
| 2006/0248456 A1 | 11/2006 | Bender et al. |
| 2015/0012807 A1 | 1/2015 | Vanden Heuvel et al. |
| 2016/0253310 A1 | 9/2016 | Hazen et al. |

(Continued)

OTHER PUBLICATIONS

Sheng et al., "Anatomy of a Privacy-Safe Large-Scale Information Extraction System Over Email," KDD 2018, ACM p. 734-743. (Year: 2018).*

(Continued)

*Primary Examiner* — Amelia L Tapp
(74) *Attorney, Agent, or Firm* — Marshall, Gerstein & Borun LLP; Randall G. Rueth

(57) ABSTRACT

A computer-implemented method for resolving date ambiguities in electronic communication documents includes identifying date field values associated with different instances of a single communication segment, with each instance of the segment occurring in a different electronic communication document. The date field values associated with those instances are processed by attempting one or more available date resolution mechanisms. For each date field value, a candidate date for the segment is identified using the highest-priority/confidence resolution possible for that particular date field value. A data structure in a cache is used to track which date field value allows a date to be resolved with the highest-priority resolution relative to the other date field values, by iteratively inspecting and comparing priority levels recorded in the data structure.

20 Claims, 6 Drawing Sheets

(56) References Cited

U.S. PATENT DOCUMENTS

2016/0259778 A1* 9/2016 Cookson .............. G06Q 10/107
2019/0068532 A1 2/2019 Horling et al.

OTHER PUBLICATIONS

Campos et al., "GTE: A Distributional Second-Order Co-Occurrence Approach to Improve the Identification of Top Relevant Dates in Web Snippets," CIKM 2012, copyright 2012, ACM, p. 2035-2039. (Year: 2012).*

* cited by examiner

AMBIGUOUS DATE RESOLUTION FOR ELECTRONIC COMMUNICATION DOCUMENTS

FIELD OF THE DISCLOSURE

The present disclosure generally relates to electronic document review and, more specifically, to technologies for processing electronic communication documents (e.g., emails) prior to user review.

BACKGROUND

In various applications, a need exists to extract meaningful information from a corpus of electronic documents. In the discovery process commonly associated with litigation, for example, attorneys are commonly provided a large corpus of electronic documents, including electronic communication documents (e.g., emails) that were received from, or may be sent to, an opposing party. Given the potentially enormous number of such documents (e.g., in the millions), analyzing each and every electronic communication document can be an extremely time-consuming process. Typically, many of these electronic communication documents convey redundant information. In an email context, for example, the corpus of emails may include a copy of a particular email from the sender's outbox, and another copy from the inbox of each recipient. In such instances, a reviewer does not need to review each copy of the email to determine whether the email is relevant to the discovery process. As another example, an email message may include information from previous emails within an email chain (e.g., as can be seen by scrolling down while viewing the email), with the final email of a chain typically containing all of the information conveyed by prior emails within the same "conversation." In such instances, these prior emails can be safely discarded or ignored without losing any meaningful information.

"Threading" (e.g., "email threading") is a process that reduces the number of documents in a corpus of electronic communication documents by removing electronic communication documents that fail (or very likely fail) to convey new information. An email may convey new information, if, for example, the email includes a new recipient or attachment, the subject and/or the body of the email is not included in any other emails in the same chain or conversation, and/or the email is a final email in the chain or conversation. Electronic document review tools that organize electronic communication documents according to thread can provide great efficiencies in the user review process. For example, a user reviewing documents may be able to quickly identify which emails within a particular corpus of emails share a common thread (or share a common group of related threads that branch off of each other), and focus solely on that set of emails before moving on to the next thread or thread group.

To arrange electronic communication documents into conversation threads, the documents are generally pre-processed (i.e., processed prior to user review of the documents) to generate metadata indicating the ordered relationship among the documents within each thread. In one technique for determining such ordered relationships, the threading process requires identifying a number of different "communication segments" (or "conversation segments") in each document, where each communication segment corresponds to a single communication from a single person. In a given email, for example, earlier communication segments can usually be seen by scrolling down to look at previous messages in the same email chain, with each segment including a header, a message body, and possibly a signature block. The ordered relationships may then be determined by comparing the communication segments (or segment portions) of one electronic communication document to the communication segments (or segment portions) of other electronic communication documents, with any matching segments or segment portions generally indicating that two different documents belong to the same thread or the same thread group (i.e., a set of threads all sharing the same root document).

Unfortunately, various issues can make it difficult to accurately reconstruct a thread. Accurate thread reconstruction typically requires accurate identification of communication segments, segment sections (e.g., headers), and/or segment fields (e.g., header fields such as sender, recipient, and date/time). The task of identifying segments, segment sections, and segment fields can be greatly complicated, however, by the fact that different software clients (e.g., Microsoft Outlook, Lotus Notes, etc.), software client versions, and/or configurable user settings may result in different date formats for different embedded headers, even if those different headers correspond to the same communication segment (i.e., as instances of the communication segment appear in different documents).

For example, some headers may use the "DD/MM/YYYY" or "DD/MM/YY" format, while others may use the "MM/DD/YYYY" or "MM/DD/YY" format. Thus, for instance, if the "send" date in a particular embedded header is "03/05/2019" there exists ambiguity as to whether the correct date is Mar. 5, 2019, or May 3, 2019. Moreover, while various techniques have been proposed for resolving date ambiguity, inconsistencies arise if a particular technique arrives at different dates for different instances of the same communication segment that appear in different documents. With reference to the above example, for instance, an ambiguity resolution technique might determine, by applying a rule or rules, that the date "03/05/2019" is Mar. 5, 2019 for a first instance of a particular segment, but May 3, 2019 for a second instance of the same segment (i.e., where the same segment appears in a different email document).

Possibilities such as these can greatly complicate the task of parsing information within the overall threading process. In some instances, the inability to correctly determine the date of an embedded header for a communication segment can result in the omission of documents in a reconstructed thread, or incorrect threading. Thus, the above-noted difficulties associated with conventional parsing of electronic communication documents can cause information to be hidden from reviewing users, and/or cause the presentation of inaccurate information.

BRIEF SUMMARY

In one embodiment, a computer-implemented method for resolving date ambiguities in electronic communication documents includes: (1) identifying, by one or more processors of a computing system and within the electronic communication documents, a plurality of date field values each associated with a different instance of a communication segment, wherein each different instance of the communication segment occurs in a different one of the electronic communication documents; (2) processing, by the one or more processors, the identified date field values by, for each of at least some of the identified date field values, (a) resolving a candidate date for the communication segment based on the identified date field value, (b) determining, by inspecting a data structure within a cache, whether another candidate date was already resolved for the communication segment based on another one of the identified date field values, wherein the data structure includes the other candidate date, (c) when determining that another candidate date was already resolved for the communication segment, comparing, at least by inspecting the data structure, a priority level associated with the resolution of the candidate date to a priority level associated with the resolution of the other candidate date, and (d) when the priority level associated with the resolution of the candidate date is higher than the priority level associated with the resolution of the other candidate date, updating the data structure within the cache by replacing the other candidate date with the candidate date; (3) after processing the identified date field values, determining, by the one or more processors and based on a final candidate date in the data structure, an ordered relationship between the electronic communication documents; and (4) storing, by the one or more processors, metadata indicating the ordered relationship between the electronic communication documents.

In another embodiment, a non-transitory computer-readable medium stores instructions that, when executed by one or more processors of a computing system, cause the computing system to: (1) identify, within electronic communication documents, a plurality of date field values each associated with a different instance of a communication segment, wherein each different instance of the communication segment occurs in a different one of the electronic communication documents; (2) process the identified date field values by, for each of the identified date field values, (a) resolving a candidate date for the communication segment based on the identified date field value, (b) determining, by inspecting a data structure within a cache, whether another candidate date was already resolved for the communication segment based on another one of the identified date field values, wherein the data structure includes the other candidate date, (c) when determining that another candidate date was already resolved for the communication segment, comparing, at least by inspecting the data structure, a priority level associated with the resolution of the candidate date to a priority level associated with the resolution of the other candidate date, and (d) when the priority level associated with the resolution of the candidate date is higher than the priority level associated with the resolution of the other candidate date, updating the data structure within the cache by replacing the other candidate date with the candidate date; (3) after processing the identified date field values, determine, based on a final candidate date in the data structure, an ordered relationship between the electronic communication documents; and (4) store metadata indicating the ordered relationship between the electronic communication documents.

DETAILED DESCRIPTION

I. Overview

Figure 1:
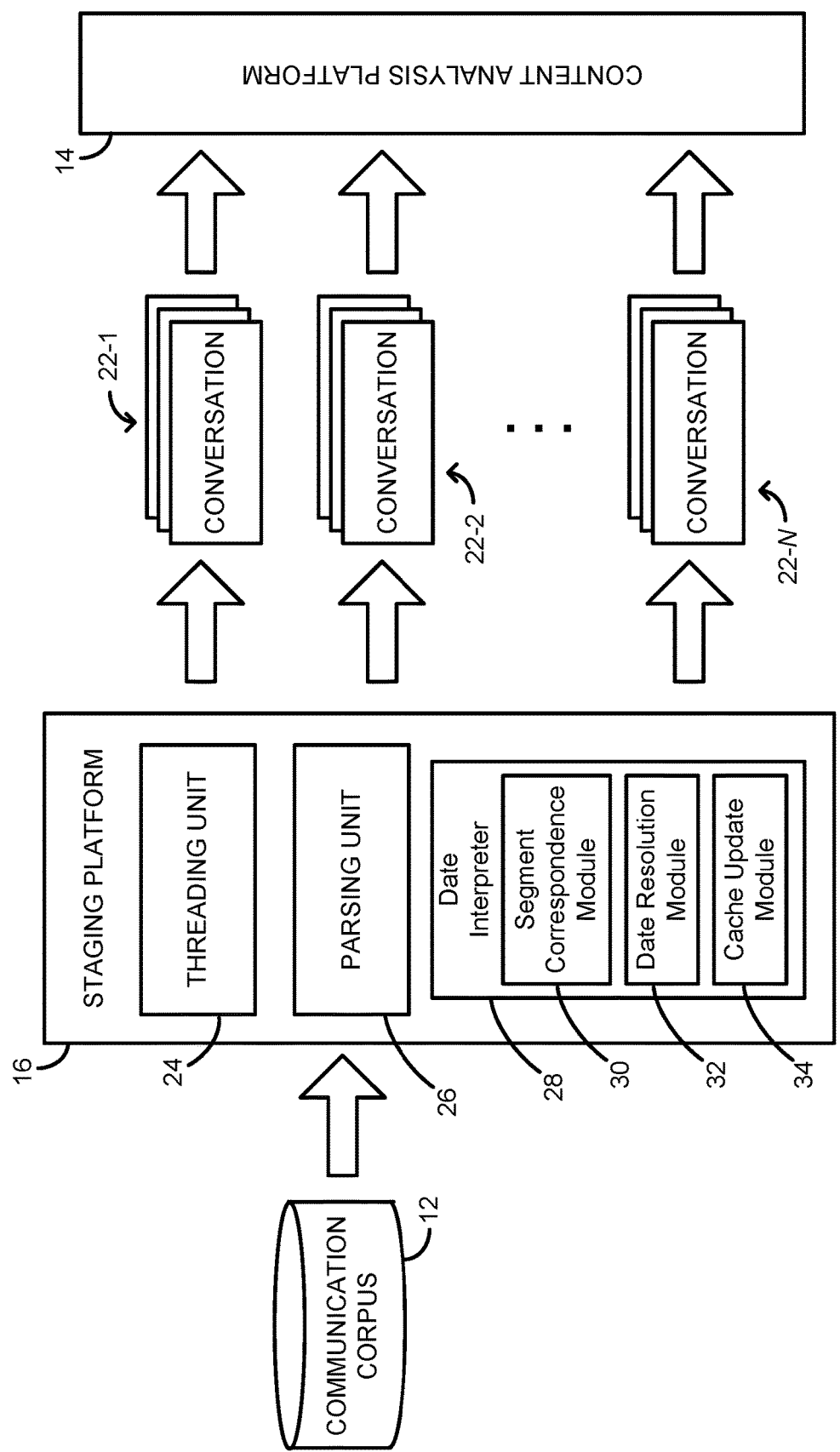
FIG. 1 depicts an example environment in which may be implemented techniques for reconstructing threads from electronic communication documents that may include ambiguous date field formats and/or values.

The embodiments described herein relate to, inter alia, the processing of electronic communication documents (e.g., emails) to reconstruct conversation threads, and to problems that specifically arise within that technical field. The systems and techniques described herein may be used, for example, in connection with electronic document review tools of the sort commonly used during litigation. However, other applications are also possible. For example, the systems and techniques described herein may be used by a company or other entity to categorize and/or review its own archived electronic communication documents (e.g., emails to and from customers, etc.), and/or for other purposes.

More specifically, the embodiments described herein relate to threading techniques that rely on the accurate identification/parsing of specific fields within the embedded headers of different communication segments of an electronic communication document, and the accurate interpretation of the values in those fields. In particular, the embodiments described herein relate to threading techniques that rely on the accurate identification/parsing and interpretation of date fields (e.g., a "sent" date for an email).

The term "communication segment" (or "conversation segment," or simply "segment"), as used herein, generally refers to the incremental content (e.g., header, message body, and possibly signature block) added at each step of a communication chain/thread, not including any modifications that may have been made to earlier segments of the conversation (e.g., by adding in-line responses to an earlier email in an email chain). Thus, for example, a root/first electronic communication document between two or more parties generally includes only a single communication segment, a reply thereto generally includes exactly two communication segments, and so on, with each new reply or forward (or draft thereof) adding an additional segment. In at least some embodiments (e.g., for conventional email documents), each successive document within the chain/thread will typically contain both the most recent communication segment and every previous segment, such that a reader can reference earlier stages of the conversation by looking further down in the text of the document.

At times herein, for reasons that will become clear, the term "segment" (alone, or within "communication segment," etc.) may be used interchangeably to either (1) refer to a unique part of the conversation thread, or (2) to a single instance of a unique part of the conversation thread, as will be apparent from the context of the usage. Thus, for example, a portion of a specific email document (representing one discrete communication in the conversation thread) may initially be referred to as a "communication segment," but later (e.g., if other, corresponding segments exist in other email documents) be referred to as one "instance" of the communication segment.

The header for a particular communication segment, other than the newest/root segment of the electronic communication document, is typically displayed in-line within the electronic communication document (e.g., after the message body of the new segment, and immediately prior to the associated segment), and is referred to herein as an "embedded" header. Each embedded header includes one or more header fields, with each field typically having an associated label (e.g., "From:" or "Author:", etc., for the sender of the electronic communication document, "To:" or "Recipient:", etc., for the party receiving the document, and so on). Some software clients use non-standard formats, including single-line headers such as the following:

On 5 Apr. 2019, Paul wrote: Good to see you yesterday!

One field included in virtually all electronic communication documents is the date field indicating when the document was communicated/sent. For example, the field may be labeled "Sent:" or "Date:". Unlike embedded headers, the header information for the electronic communication document itself, including the sending date, is typically represented purely as metadata associated with the document, rather than being displayed in-line within the text of the document.

As noted above, the formats for various fields, including the date, can change based on the software client, version, configurable user settings, and/or other factors (e.g., geographic location of the sender), even across different instances of the same communication segment, which can make accurate threading difficult or (in some scenarios) impossible. In some embodiments of this disclosure, new processing technologies are implemented in order to determine dates, including for date field values having ambiguous formats and/or values (e.g., 03/05/2010, or 03-05-10, or 3-5-10, etc.), with increased accuracy, and in a consistent manner across all instances of a given communication segment.

In general terms, the techniques disclosed herein attempt to resolve date ambiguities by identifying the date field values that are associated with different instances of the same communication segment, with each instance of the communication segment occurring in a different electronic communication document. The technique makes use of a number of different "date resolution mechanisms" that can resolve ambiguous (or potentially ambiguous) date field values to a specific date, and that are each associated with a respective priority level indicative of the certainty/confidence level associated with that specific date. For example, if a certain date resolution mechanism always either (1) cannot resolve a date, or (2) resolves a date with substantially 100% certainty, that mechanism may have a priority level than, or cause a priority level to increase more than, other available date resolution mechanisms. Conversely, as another example, a certain date resolution mechanism may resolve dates by inferring timing of a segment based on its proximity to other segments, and/or based on other, similar factors, and so may have a relatively low priority level, or have a relative damping effect on the priority level. On the other hand, the latter mechanism may be able to resolve dates for far more date field values than the former mechanism.

For each identified date field value, the technique may attempt one or more of the available date resolution mechanisms and, for each attempted mechanism, see whether a date can be resolved. Moreover, the technique tracks which mechanism, of the attempted mechanisms that were able to resolve a date, resulted in a highest priority or confidence level. The priority level associated with each successful resolution attempt may simply be the priority level of the date resolution mechanism itself, or a priority level that accounts for not only a mechanism-specific priority level of that date resolution mechanism, but also one or more other factors.

The technique processes all of the date field values associated with the various instances of the communication segment in this same manner, determining for each date field value (1) which date resolution mechanism results in the highest priority date resolution, and (2) the date corresponding to that highest-priority date resolution. However, the technique also seeks to establish, for the communication segment and all of its instances, a single date that is most likely to be accurate.

To this end, the technique creates and maintains, in a cache, a data structure associated with the communication segment, and implements an iterative process. When a first one of the date field values is processed in the above manner, the technique creates or initializes a data structure, and includes in the data structure an identifier of the communication segment (e.g., a hash and possibly other information), the date corresponding to the highest-priority resolution of the first date field value, and some indication of the priority level associated with that highest-priority resolution.

Next, the technique processes a second date field value (from a different electronic communication document) in the above manner, thereby determining for the second date field value a date corresponding to a highest-priority resolution of that second date field value. The data structure is then inspected in order to compare the priority level of the date resolved for the second date field value to the priority level of the date resolved for the first date field value. If the former has a higher priority than the latter, the data structure is updated in the cache to include the resolved date for the second date field value, and an indicator of the priority level associated with the resolution of that date. This process may repeat iteratively for any additional date field values that were identified for the communication segment in other electronic communication documents. Thus, the dates resulting from the highest-priority resolution of the various date field values identified for the communication segment may be viewed as "candidate" dates, until the process is complete. Upon process completion, the date remaining in the data structure may be viewed as the "best" date, and the technique applies that date consistently across all of the instances of the communication segment for purposes of conversation threading.

The techniques described herein improve the technology of electronic communication document threading. In particular, by replacing conventional threading techniques with one or more of the techniques described herein, dates of communication segments (e.g., within embedded headers) may be more accurately and consistently identified, thereby providing or allowing a more accurate reconstruction of conversation (e.g., email) threads for user review.

II. Example Environments for Reconstructing Electronic Communication Document Threads FIG. 1 depicts an example environment 10 in which a corpus of electronic communication documents 12 is staged for analysis via a content analysis platform 14, according to one embodiment. Communication corpus 12 may include a plurality (e.g., thousands, millions, etc.) of electronic communication documents. As used herein, the term "electronic communication document" generally refers to an electronic document that represents an exchange (or a potential/planned exchange, as in the case of a draft email) between two or more individuals. However, the term can also (in some embodiments and/or scenarios) include documents that are addressed from an individual to himself or herself (e.g., an email sent from the individual's personal email account to his or her work email account). While some of the examples described herein refer specifically to email, it should be appreciated that the techniques described herein are applicable to other types of electronic communication documents. For example, some instant messaging applications may archive a conversation upon its conclusion. The electronic file that represents the instant messaging conversation may be considered an "electronic communication document." As another example, social media platforms may support their own form of messaging (e.g., a Facebook message, an Instagram direct message, etc.). Each of these messages may also be considered an "electronic communication document." Furthermore, recent email platforms like Slack blend several types of electronic communications into a single conversation. Electronic files that underlie these types of email platforms may also be considered "electronic communication documents."

Communication corpus 12 may be ingested into a staging platform 16 to organize communication corpus 12 in a manner that facilitates efficient analysis via content analysis platform 14. Communication corpus 12 may be ingested into staging platform 16 by executing a computer program on a computing device that has access to the environment 10. The ingestion process may involve the computer program providing an instruction to staging platform 16 as to a location at which communication corpus 12 is stored, for example. Using this location, staging platform 16 may access communication corpus 12 for performing conversation threading techniques.

Staging platform 16 may analyze communication corpus 12 to arrange the electronic communication documents into threaded conversations 22-1 through 22-N, where N is any positive integer. As used herein, a "conversation thread" (or simply "thread") refers to an ordered sequence of electronic communication documents, starting at a first ("root") document and proceeding to a single, final document, with each successive document in the thread corresponding to a particular user action that was taken in connection with the immediately preceding document. Thus, for example, a single conversation thread may include an initial email, a "reply-all" to the initial email (i.e., a reply to the sender and all other recipients of the initial email), a forward of the "reply-all" email, and a reply to the forwarded email. Each of threaded conversations 22-1 through 22-N may represent documents of only a single (non-branching) conversation thread, or may represent documents of a group of multiple conversation threads that all have different endpoints (final documents) but share the same root electronic communication document.

In the embodiment of FIG. 1, staging platform 16 includes a threading unit 24 to generate threaded conversations 22-1 through 22-N (or, more precisely, data indicative of the ordered arrangements/relationships within each of threaded conversations 22-1 through 22-N). This may be accomplished in various different ways, depending on the embodiment. For example, threading unit 24 (or, in some embodiments, parsing unit 26 or another unit of server 106) may generate a "fingerprint" for each conversation segment of each electronic communication document. The fingerprint may be a hash of one or more header fields (e.g., sender and date/time) within each conversation segment, or a hash of the body of the communication and other information (e.g., a hash of subject line plus body). Threading unit 24 may compare the sets of segment fingerprints for different documents in order to identify matching segments, which may in turn enable threading unit 24 to identify which documents belong to the same thread, as well as the order/arrangement of documents within the thread.

Regardless of whether a fingerprint technique is used, threading unit 24 generally relies on (or at least, attempts to make use of) information within the header of each conversation segment to generate threaded conversations 22-1 through 22-N. To provide such information to threading unit 24, staging platform 16 may include a parsing unit 26 that is configured to parse the documents in communication corpus 12 prior to threading. For example, parsing unit 26 may parse documents to identify different communication segments within each document, and to identify various fields within the embedded headers of each communication segment, including at least a date field (and possibly others, such as a sender field, a recipient field, a subject line field, and so on). It should be appreciated that parsing unit 26 may be a component within threading unit 24, rather than a separate unit.

Because date fields of different communication segments can have a number of different formats, including ambiguous (or potentially ambiguous) date formats, it is generally not sufficient to simply parse the value of each date field in a straightforward manner (such as would be the case, for example, if every date format expressed the month using its name and the year with four digits, such as "Aug. 3, 2019"). Thus, to facilitate the determination of dates for the date field values of different communication segments, staging platform 16 also includes a date interpreter 28.

Date interpreter 28 generally determines dates, or likely dates, for different communication segments, or different instances of a communication segment, based on the date field values of those segments, and seeks to do so in a manner that is consistent across different electronic communication documents containing different instances of the same communication segment. To that end, date interpreter 28 may include a segment correspondence module 30, a date resolution module 32, and a cache update module 34. Generally, segment correspondence module 30 identifies all instances of a given communication segment across the electronic communication documents in corpus 12 (or some subset thereof), date resolution module 32 attempts to resolve a date for each date field value within those identified instances by applying one or more resolution mechanisms to each one, and cache update module 34 implements a process of iteratively updating a cache (as described in further detail below) to determine the most reliable (highest priority/confidence) resolution of a date that can be achieved for any of those date field values.

Date interpreter 28 then applies this "most reliable" date (as recorded in the cache data structure) to all of the instances of the communication segment, to ensure consistent dates for threading purposes. Operation of correspondence module 30, date resolution module 32, and cache update module 34, and date interpreter 28 more generally, is discussed in further detail below.

Threading unit 24 may use the data from date interpreter 28 (and possibly also parsing unit 26 and/or one or more other processing units in staging platform 16), including the resolved dates that are consistent across different instances of a single communication segment, to arrange the electronic communication documents into threaded conversations 22-1 through 22-N as discussed above. Once generated, threaded conversations 22-1 through 22-N may be ingested into content analysis platform 14. In some embodiments, content analysis platform 14 includes an electronic document review (EDR) interface that enables one or more reviewers to analyze the threaded conversations 22-1 through 22-N. Additionally or alternatively, in some embodiments, content analysis platform 14 includes a conceptual indexing tool that performs clustering and/or other operations on the threaded conversations 22-1 through 22-N to assist the reviewer.

Figure 2:
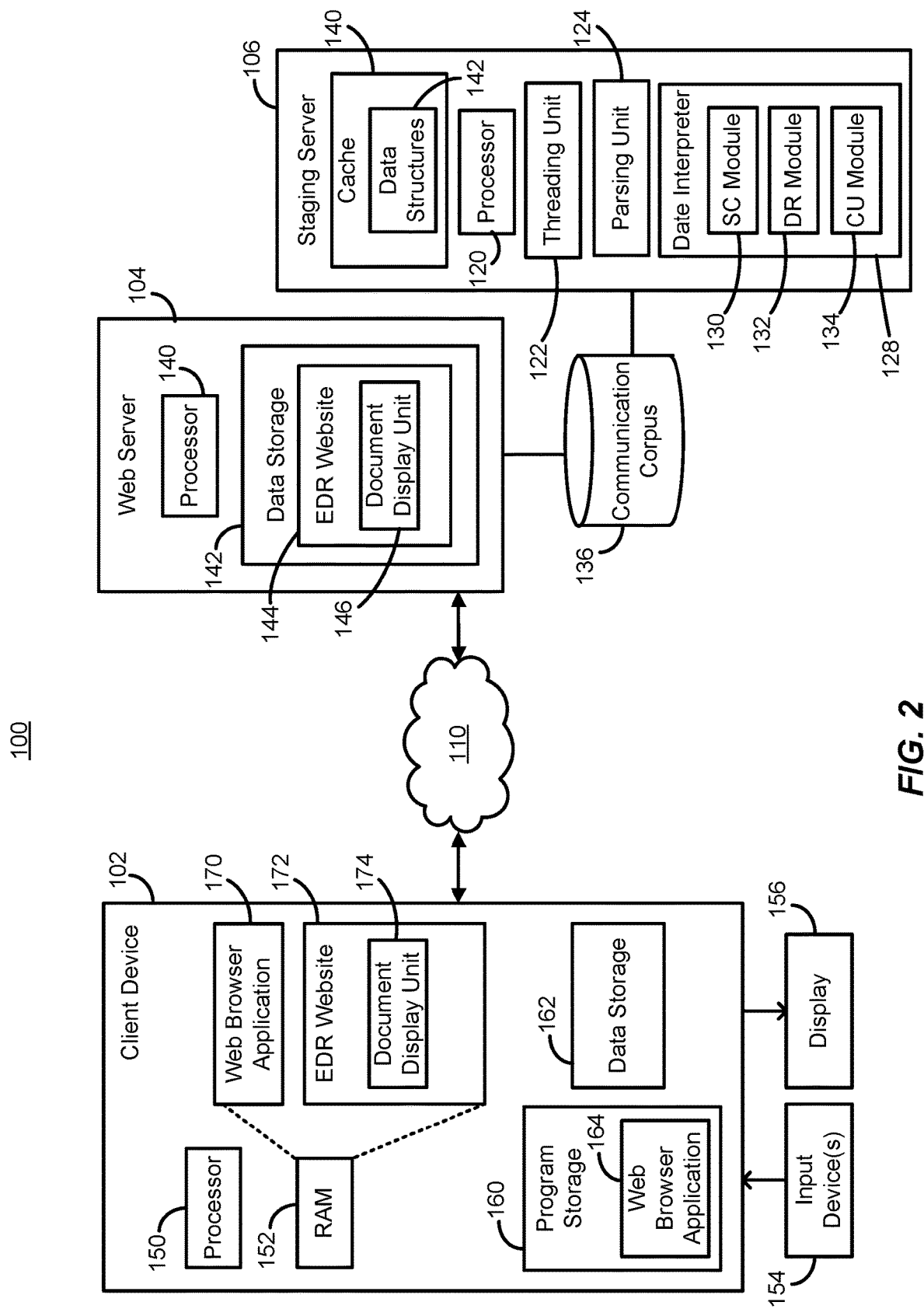
FIG. 2 depicts another example environment in which may be implemented techniques for reconstructing threads from electronic communication documents that may include ambiguous date field formats and/or values.

FIG. 2 depicts an example environment 100 that may correspond to one embodiment of the environment 10 of FIG. 1, but also includes various user/client-side components. It is understood that "client," in this context, refers to the user who may review threaded documents, and thus has a different meaning than a software "client" that was used to generate a particular electronic communication document. The environment 100 includes a client device 102, a web server 104, and a staging server 106. Client device 102 is communicatively coupled to web server 104 via a network 110. Network 110 may be a single communication network, or may include multiple communication networks of one or more types (e.g., one or more wired and/or wireless local area networks (LANs), and/or one or more wired and/or wireless wide area networks (WANs) such as the Internet). Web server 104 may be remote from or co-located with staging server 106. Web server 104 and staging server 106 may each be an individual server, or may each include a group of multiple servers. Alternatively, web server 104 and staging server 106 may be combined in a single server.

Generally, web server 104 hosts web services relating to electronic document review, which may be accessed/utilized by client device 102, and staging server 106 implements certain back-end operations (e.g., conversation threading) in support of the document review services provided to client device 102. For example, staging server 106 may be used as (or within) staging platform 16 of FIG. 1, and web server 104 may be used as (or within) content analysis platform 14 of FIG. 1. While FIG. 2 shows only a single client device 102, it is understood that multiple different client devices (of different entities and/or users), each similar to client device 102, may be in remote communication with web server 104.

Staging server 106 includes a processor 120. While referred to in the singular, processor 120 may include any suitable number of processors of one or more types (e.g., one or more microprocessors, etc.). Generally, processor 120 is configured to execute software instructions stored in one or more memories (e.g., stored in a persistent memory such as a hard drive or solid state memory) of staging server 106. The software instructions, when executed by processor 120, implement a threading unit 122, a parsing unit 124, and a date interpreter 128, which may correspond to threading unit 24, parsing unit 26, and/or date interpreter 28, respectively, of FIG. 1. In some embodiments, threading unit 122, parsing unit 124, and/or date interpreter 128 is/are part of a larger application or set of applications, which pre-processes electronic documents of all sorts for various purposes in addition to conversation threading. For example, such an application or application set may convert newly loaded electronic documents to a PDF format, assign identifiers/labels to newly loaded documents, implement textual and/or conceptual de-duplication of documents, and so on.

Date interpreter 128 includes a segment correspondence module 130, a date resolution module 132, and a cache update module 134, which may correspond to the segment correspondence module 30, date resolution module 32, and cache update module 34, respectively, of FIG. 1, and which are described in more detail below.

Staging server 106 also includes a cache 140. As used herein, the term "cache" may broadly refer to any type or hardware or software component that stores data in a manner that is suitable for access and modification during real-time computations (e.g., having suitably fast read/write rates). Cache 140 includes a number of data structures 142, which, as explained below, may each correspond to a different communication segment (i.e., to all instances of a specific communication segment).

A communication corpus 136 may correspond to communication corpus 12 of FIG. 1. Communication corpus 136 may be stored in one or more persistent memories. In some embodiments, communication corpus 136 is stored in locations distributed across a large geographic area. In a manner similar to that discussed above in connection with FIG. 1, electronic communication documents in communication corpus 136 may be processed by parsing unit 124, and the resulting data (e.g., data indicating header field values, or interpreted header field values such as dates, for communication segments within each document) may be passed to threading unit 122 to enable threading unit 122 to arrange the documents into conversation threads. Threading unit 122 may then generate metadata indicating the ordered relationship among documents within each thread. The metadata may be stored in communication corpus 136 in association with the appropriate documents, or in another suitable corpus or database, for example.

Web server 104 includes a processor 140. As with processor 120, processor 140 may include any suitable number of processors and/or processor types. Generally, processor 140 is configured to execute software instructions stored in one or more memories (e.g., stored in a persistent memory such as a hard drive or solid state memory) of web server 104. Web server 104 also includes a data storage 142 (e.g., one or more persistent memories) that stores one or more web pages of an electronic document review (EDR) website 144. EDR website 144 may include instructions of the web pages (e.g., HyperText Markup Language (HTML) instructions, JavaScript instructions, JavaServer Pages (JSP) instructions, and/or any other type of instructions suitable for defining the content and presentation of the web page(s)), and/or may include instructions of a plug-in, extension, and/or stand-alone software component that may be downloaded by client device 102. EDR website 144, or another application or unit of web server 104 that is not shown in FIG. 2, may also include instructions for communicating with communication corpus 136 (and possibly another corpus/database including metadata generated by threading unit 122) as needed to obtain or modify the data stored therein. In other embodiments, web server 104 accesses communication corpus 136 only indirectly, such as through staging server 106 (e.g., by sending requests for data to staging server 106) or another server.

Generally, EDR website 144 provides users accessing EDR website 144 with a browser-based user interface that enables the review of documents in communication corpus 136. To this end, EDR website 144 may include instructions of a document display unit 146 that enables a user to review the content of specific, selected documents via his or her web browser. EDR website 144 may also include instructions configured to recognize various inputs from users, and to act accordingly (e.g., to download and/or display another document in response to the user selecting the document, and/or to save user tags/designations for documents to communication corpus 136, etc.).

Client device 102 may be a laptop computer, a desktop computer, a tablet, a smartphone, or any other suitable type of computing device. In the embodiment of FIG. 2, client device 102 includes a processor 150, a random-access memory (RAM) 152, one or more input devices 154, a display 156, a program storage 160, and a data storage 162. As with processors 120 and 140, processor 150 may include any suitable number of processors and/or processor types.

Processor 150 may include one or more microprocessors (e.g., one or more central processing units (CPUs) and one or more graphics processing units (GPUs)), for example. Generally, processor 150 is configured to execute software instructions stored in program storage 160. Program storage 160 may include one or more persistent memories (e.g., a hard drive and/or solid state memory), and stores a number of applications including a web browser application 164. Data storage 162 may also include one or more persistent memories, and generally stores data used by applications stored in program storage 160. For example, data storage 162 may store local copies of electronic communication documents that were downloaded from communication corpus 136 via web server 104.

Input device(s) 154 may include components that are integral to client device 102, and/or exterior components that are communicatively coupled to client device 102, to enable client device 102 to accept inputs from the user. For example, input device(s) 154 may include a mouse, a keyboard, a trackball device, a microphone, etc. Display 156 may also be either integral or external to client device 102, and may use any suitable display technology (e.g., LED, OLED, LCD, etc.). In some embodiments, input device(s) 154 and display 156 are integrated, such as in a touchscreen display. Generally, input device(s) 154 and display 156 combine to enable a user to interact with user interfaces provided by client device 102.

RAM 152 stores portions of the instructions and data stored by program storage 160 and data storage 162 when processor 150 executes applications stored in program storage 160. When processor 150 executes web browser application 164, for example, RAM 152 may temporarily store the instructions and data required for its execution. In FIG. 2, web browser application 164 (while being executed) is represented in the program space of RAM 152 as web browser application 170. When the user of client device 102 uses web browser application 164 to access EDR website 144, any scripts or other instructions of EDR website 144 (e.g., instructions associated with document display unit 146) may be stored as a local copy in RAM 152. FIG. 2 illustrates a scenario where EDR website 144 is stored in RAM 152 as EDR website 172, document display unit 146 is stored in RAM 152 as document display unit 174. Web browser application 170 may interpret the instructions of each of the local copies to present the page(s) of EDR website 144 to the user, and to handle user interactions with the page(s) as discussed further below. When various functions or actions are attributed herein to EDR website 172 or document display unit 174, it is understood that those actions may be viewed as being caused by web server 104, by way of providing the instructions of EDR website 144 or document display unit 146, respectively, to client device 102 via network 110.

In operation, the user of client device 102, by operating input device(s) 154 and viewing display 156, opens web browser application 164 to access EDR website 144 for purposes of reviewing (and possibly designating categories or classifications of) electronic documents. To fully access EDR website 144, the user may be required to satisfy certain security measures, such as entering a valid login and password, for example. The user may then utilize a web page of EDR website 144 to indicate the project or workspace that he or she wishes to access. Web server 104 may use the indication of the project or workspace to identify the appropriate set of documents in communication corpus 136, or to identify the entirety of communication corpus 136 (e.g., if corpus 136 only includes electronic communication documents for a single project or workspace).

By the time the user of client device 102 accesses EDR website 144, the documents in communication corpus 136 may already have been pre-processed by staging server 106. For example, parsing unit 124 and threading unit 122 of staging server 106 may have previously identified which electronic communication documents belong to which threads and thread groups, and may have stored metadata indicative of those relationships in communication corpus 136 or another database.

In an embodiment, when the user of client device 102 selects a specific electronic communication document (e.g., from a list of document identifiers presented by EDR website 172, and each corresponding to a document in communication corpus 136), web server 104 retrieves the electronic communication document from communication corpus 136, along with associated metadata indicating thread-related information. Web server 104 may then transmit the document and metadata to client device 102, where document display unit 174 may cause the text (and possibly images) of the selected electronic communication document to be presented to the user via a graphical user interface (GUI) on display 156. EDR website 172 may also cause thread-related information to be presented to the user on display 156. For example, web server 104 or client device 102 may use the thread-related metadata to present to the user a display indicative of the ordered relationship among documents in one or more threads (e.g., an indented list of document identifiers with the first level of indentation corresponding to a root document of a thread, and/or a visualization that graphically depicts the relationship among documents within a thread, etc.).

In some embodiments, a user can code the electronic communication documents that he or she is reviewing according to certain predefined and/or user-created tags/designations, such as "privilege," "no privilege," "responsive," "not responsive," and so on. In some embodiments, user changes to the designations for an electronic communication document are communicated to web server 104, which modifies the document designation appropriately (e.g., within communication corpus 136 or another location, depending upon where such data is stored). Web server 104 may directly modify the designation, or may request that another device or system (e.g., staging server 106) do so.

While FIG. 2 shows an embodiment in which an electronic document review tool is provided as a web-based service, it is understood that other embodiments are also possible. For example, program storage 160 of client device 102 may store a software product that enables client device 102 to interface directly with staging server 106, without requiring web server 104, or to interface with another server (not shown in FIG. 2) that acts as an intermediary between staging server 106 and any client devices. In still another embodiment, a software product installed at client device 102 may enable client device 102 to directly implement the functions of staging server 106.

Moreover, the various components of the environment 100 may interoperate in a manner that is different than that described above, and/or the environment may include additional components not shown in FIG. 2. For example, an additional platform/server may act as an interface between web server 104 and staging server 106, and may perform various operations associated with providing the threading and/or other services of staging server 106 to web server 104 and/or other web servers.

Operation of date interpreter 128 (and to a lesser extent, parsing unit 124 and threading unit 122), according to various embodiments, will now be described in further detail with reference to FIGS. 3 through 5.

III. Date Interpretation

Figure 3A:
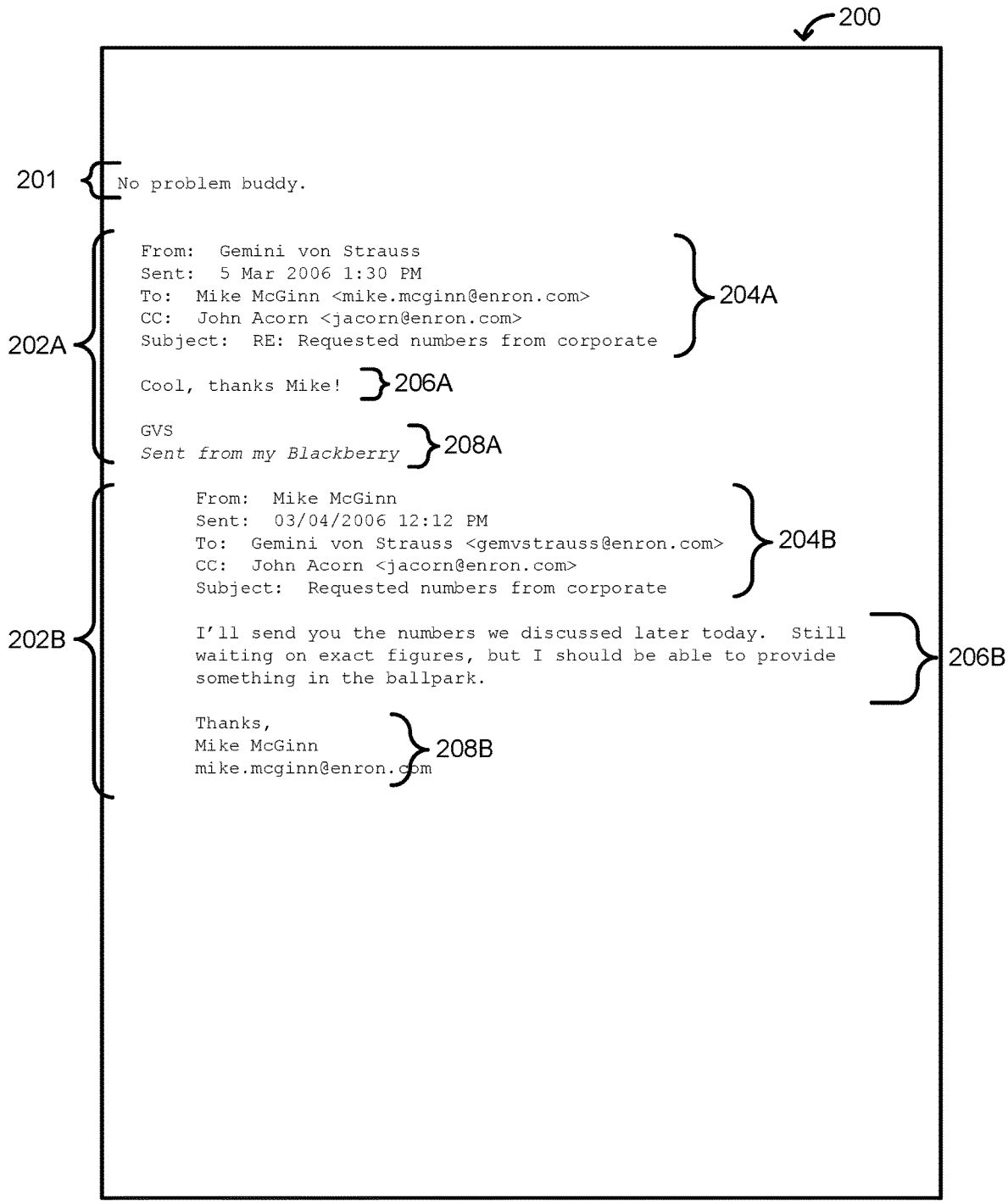
FIGS. 3A and 3B depict the text-based content of two example electronic communication documents that may be processed in the environment of FIG. 2.
Figure 3B:
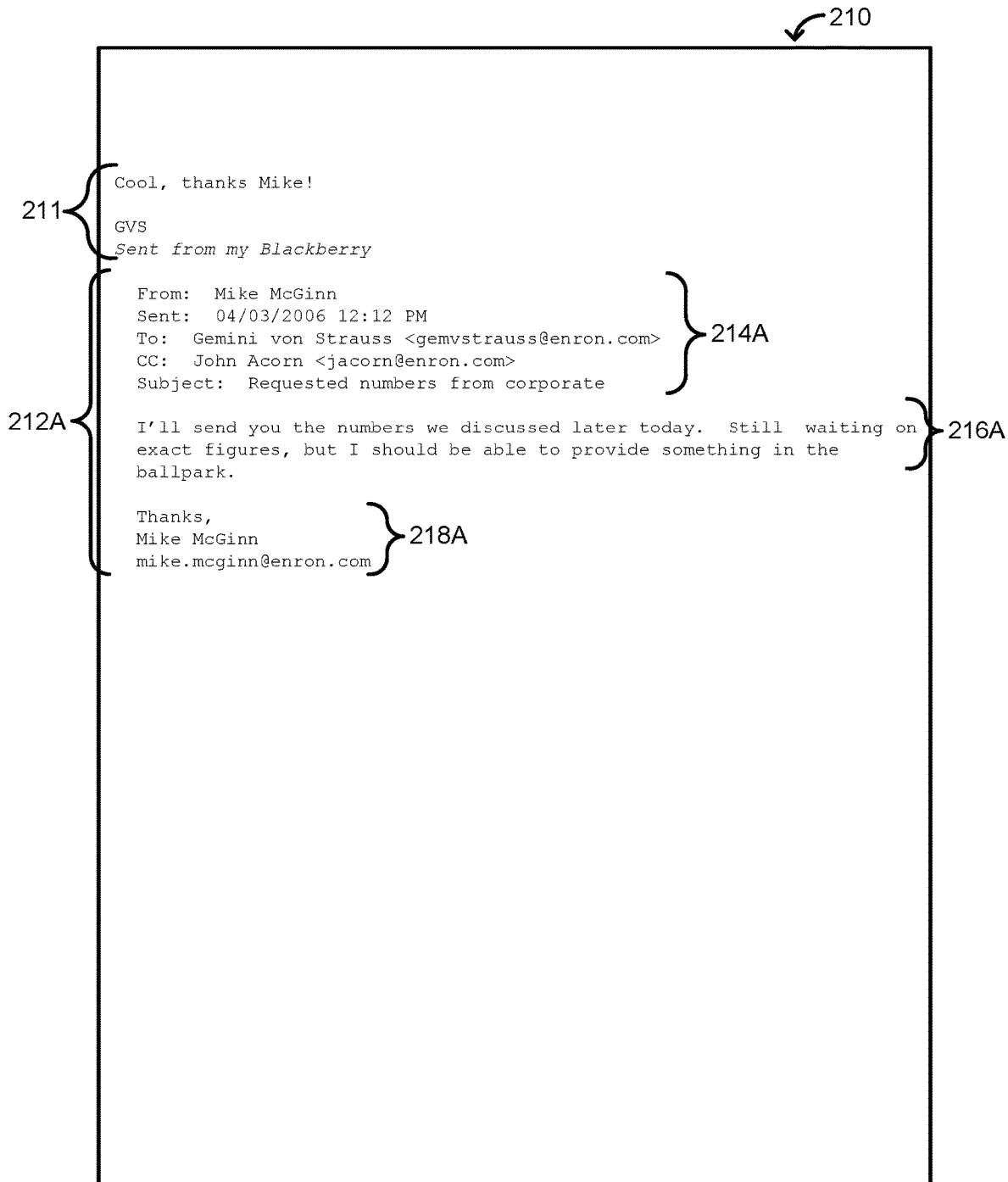

FIGS. 3A and 3B depict text-based content of two example electronic communication documents 200 and 210, respectively, which may both be processed using a parsing unit such as parsing unit 26 of FIG. 1 or parsing unit 124 of FIG. 2, and a date interpreter such as date interpreter 28 of FIG. 1 or date interpreter 128 of FIG. 2, for example. For ease of explanation, FIGS. 3A and 3B will be described with specific reference to parsing unit 124, date interpreter 128, and modules 130, 132, 134 of FIG. 2. While the documents 200 and 210 are shown in the form that they might appear to a reviewing user, the documents 200 and 210 may be in any suitable format (e.g., EML format), or in two different formats (e.g., EML and MSG).

Referring first to FIG. 3A, electronic communication document 200 includes three conversation segments: a root (most recent) segment 201, a first segment 202A that preceded (time-wise) root segment 201, and a second segment 202B that preceded (time-wise) segment 202A. Segments 202A and 202B include respective embedded headers 204A and 204B, message bodies 206A and 206B, and signature blocks 208A and 208B. In this example, no header or signature block information is shown for root segment 201 (e.g., header information for root segment 201 may only be included in metadata associated with document 200).

As seen in FIG. 3A, embedded header 204A includes the date field value "5 Mar. 2006" and the embedded header 204B includes the date field value "03/04/2006". Depending on the embodiment, the times shown (1:30 PM and 12:12 PM, respectively) may be different field values, or the date field values mentioned about may be sub-fields of a broader field (e.g., a "Sent:" field) that includes both date and time.

Referring to FIG. 3B, electronic communication document 210 includes two conversation segments: a root (most recent) segment 211, and a first segment 212A that preceded (time-wise) root segment 211. Segment 212A includes an embedded header 214A, a message body 216A, and a signature block 218A. Header information for root segment 211 may only be included in metadata associated with document 210. As seen in FIG. 3B, embedded header 214A includes the date field value "04/03/2006".

In one embodiment, parsing unit 124 processes documents 200 and 210 (e.g., sequentially) to identify the positions of the embedded headers within the documents 200 and 210, respectively. Parsing unit 124 may identify the embedded headers (204A, 204B, 214A) in any suitable manner, such as by applying heuristic rules or algorithms based on various factors (e.g., assuming that each segment begins with a header and ends with a blank line or multiple adjacent carriage returns, and/or by analyzing the position and/or number of colons, line lengths, the inclusion of information in a recognized date format, etc.), for example.

Once parsing unit 124 has identified a particular embedded header (e.g., beginning and end positions of the embedded header within the corresponding document 200 or 210), parsing unit 124 may examine different portions of that embedded header to identify various fields, including the date field (e.g., a sub-field of the "Sent:" field). For each identified field, parsing unit 124 also determines the value of that field. In the example of FIGS. 3A and 3B, for instance, parsing unit 124 determines a date field value of "5 Mar. 2006" for segment 202A, a date field value of "03/04/2006" for segment 202B, and a date field value of "04/03/2006" for segment 212A.

Before or after (depending on the embodiment) parsing unit 124 identifies these date field values, segment correspondence module 130 of date interpreter 128 determines which segments, among all the documents being processed (including documents 200, 210), correspond to each other (i.e., are actually different instances of the same segment). In some embodiments, however, this task is partially or wholly completed by another unit of staging server 106. For example, if hashing is used to identify corresponding communication segments, that hashing may be performed by parsing unit 124, and/or by another unit (not shown in FIG. 2) that performs hashing after parsing unit 124 identifies field values, etc.

As a more specific example, to identify different instances of the same communication segment in documents 200, 210 (and possibly other documents), segment correspondence module 130 (or another module of staging server 106 that is outside of date interpreter 128) generates a hash (e.g., an MD5 hash) of the subject and body of each segment instance. Additionally or alternatively, other information may be used to identify corresponding segments. For example, the MD5 hash of the subject and body of each segment may be used, along with the sender/author (e.g., "From:" field value) of each segment instance, as a fingerprint for the segment, and compare those fingerprints. All segments that match each other (or, in some embodiments, meet some matching criteria that do not require 100% matching) may then be classified or tagged as different instances of the same segment.

In some of these embodiments, the system can match segments even when the segments use different aliases for the author. In these embodiments, each field value for the author may be divided into "tokens" that correspond to different names within the author's full name (e.g., first name and last name). These tokens may be identified by searching for delimiters such as spaces or commas in each date field value, for example, or periods that may occur in email addresses, etc. In some embodiments, capitalization is removed from the field values when those values are translated to tokens, and/or certain characters are removed (e.g., an "@" symbol and all subsequent characters), etc. Thus, for example, the author field value "Mike McGinn" may be tokenized as {mike, mcginn}, as may be the author field values "mike.mcginn@enron.com" or "<mike mcginn@enron.com>". As an alternative example, the author field value "m.mcginn@enron.com" may be tokenized as {m, mcginn}.

For a token pair such as {mike, mcginn}, segment correspondence module 130 (or another module of staging server 106) may perform a two-way check to determine whether any given pair of author field values are aliases of each other. For the token pair {mike, mcginn} and the token pair {m, mcginn} (corresponding to author field values from different headers/segments), for example, the module may check (1) whether the first token (character string) of the first token pair is a subset of (or identical to) the first token of the second token pair, and vice versa, and (2) whether the second token of the first token pair is a subset of (or identical to) the second token of the second token pair, and vice versa. In the above example, for instance, "m" is a subset of "mike" (as determined when comparing the first token in each direction) and "mcginn" is identical to "mcginn" (as determined when comparing the second token in each direction). In some embodiments, a successful check (i.e., finding a subset or match/identity) for both the first and second tokens results in an indication of a 100% match, a successful check for only one of the first and second tokens results in an indication of a 50% match (or, in some embodiments, no match), and no successful check results in no match. In some embodiments, the check is performed across different token positions in different token pairs. For example, in addition to the above checks, it may be determined whether the first token of the first pair is a subset of (or identical to) the second token of the second pair (and vice versa), and whether the second token of the first pair is a subset of (or identical to) the first token of the second pair (and vice versa). In such an embodiment, a 100% match may still require only two successful checks (of the four that are potentially attempted), and a 50% match may still require only one successful check.

After segment correspondence module 130 (or another module of staging server 106) identifies the different instances of a particular communication segment, date resolution module 132 may proceed to process the parsed date field values for those different instances. Referring again to FIGS. 3A and 3B, for example, hashing techniques may be used to determine that segment 202B of document 200 and segment 212A of document 210 are in fact different instances of the same segment (i.e., different instances of the same portion of the original conversation thread), after which date resolution module 132 may process the corresponding date field values (i.e., "03/04/2006" and "04/03/2006") to determine a date that should be universally applied to that segment (i.e., to both instances 202B, 212A of the segment).

The processing performed by date resolution module 132 includes attempting to resolve a date for each date field value associated with an instance of the same communication segment. While this only results in two date field values in the scenario of FIGS. 3A and 3B, it should be appreciated that, in other scenarios, segment correspondence module 130 may identify three or more instances of a single segment (e.g., hundreds of instances), in which case date resolution module 132 attempts to resolve a date for each of the corresponding three or more date field values, and apply a consistent date to all of those instances of the segment.

For any given date field value, date resolution module 132 is capable of attempting to resolve a date by applying a number of different available date resolution mechanisms. Each of the date resolution mechanisms may be associated with a respective priority level, representative of how reliable or accurate that mechanism is. For example, a resolution mechanism that, for any given date field value, will in all cases either (1) determine a date for the date field value with substantially 100% certainty, or (2) fail to resolve any date whatsoever for the date field value, may have a highest priority among the mechanisms in the set. Other mechanisms (e.g., as discussed below), capable of resolving dates for date field values in a manner that may or may not be 100% certain, or is never 100% certain, may have lower priority levels. Various example mechanisms are discussed in greater detail below.

In some embodiments, the priority level of a given date resolution simply corresponds to the priority level of the date resolution mechanism that provided the date resolution. In other embodiments, however, date resolution module 132 assigns a priority level for a given resolution of a date field value based not only on a mechanism-specific priority level (i.e., the priority level of the mechanism that was used to successfully resolve a date), but also based on one or more other factors. For example, the "overall" priority level may be based on the mechanism-specific priority level (e.g., a numeric ranking, score, code, etc.) of the mechanism used, a total number of segments in the electronic communication document that contained the date field value being resolved (e.g., with fewer segments corresponding to a higher priority level), a time distance between the segment of the date field value being resolved and another segment that is used to help resolve the date (e.g., with a shorter time distance corresponding to a higher priority level), and/or one or more other factors.

Date resolution module 132 determines, for a given date field value, which of the successful date resolutions (by one or more date resolution mechanisms) provides a highest priority/confidence level. To make this determination, date resolution module 132 may compare the priority levels (as discussed above) associated with all of the successful date resolutions of the date field value. In some embodiments and scenarios, however, date resolution module 132 can find the highest priority resolution for a given date field value by first attempting the date resolution mechanism, of the set of available resolution mechanisms, that has the highest priority level among the set. If that mechanism cannot resolve a date, date resolution module 132 attempts the date resolution mechanism with the next-highest priority level, and so on, until one is successful. In some of these embodiments, date resolution module 132 stops attempting any further date resolution mechanisms as soon as one can successfully resolve a date for the date field value, because that is necessarily the highest-priority mechanism from the set. In this manner, average processing time and resource usage may be reduced.

Thus, date resolution module 132 may be able to identify the highest-priority resolution of a date for any given date field value, and determine the corresponding date. With reference to FIG. 3A, for example, date resolution module 132 may determine that the highest-priority resolution for the date field value of segment 202A ("5 Mar. 2006") is one that determines with 100% certainty that this corresponds to Mar. 5, 2006 (e.g., by applying very simple text matching algorithms, etc.), while determining that the highest-priority resolution for the date field value of segment 202B ("03/04/2006") is one that determines with roughly 80% certainty (or 50% certainty, etc.) that this corresponds to Mar. 4, 2006 (e.g., by using simple rules, or by comparing the two possible dates Mar. 4, 2006 and Apr. 3, 2006 to the unambiguous date of the segment 202A, etc.). The former resolution would have a relatively high priority level, while the latter would have a relatively low priority level.

Date resolution module 132 may also, by operating in conjunction with cache update module 134, identify the highest-priority date resolution across all of the date field values associated with the different instances of the communication segment. Generally, this is achieved by utilizing data structure 142 in cache 140. Data structure 142 is an updateable record for the communication segment (e.g., indexed to or otherwise including a hash of the segment), which keeps track of which date field value, of all the date field values processed by date resolution module 132 up until the present time, allows the highest-priority resolution of a date. In particular, each time date resolution module 132 identifies the highest-priority resolution for a given one of the date field values (by applying one or more resolution mechanisms as discussed above), cache update module 134 inspects data structure 142 to see whether a previous resolution for any of the other date field values had a higher priority level (or, in some embodiments, had at least as high of a priority level). If not, cache update module 134 may overwrite the record of the previous highest-priority resolution in data structure 142 with a record of the new highest-priority resolution.

More specifically, data structure 142 may include, in addition to the hash or other indicator of the communication segment, an indication of the priority level associated with the (currently) highest-priority resolution, as well as the date provided by that resolution. In other embodiments, data structure 142 may also include other types of information. It should be appreciated that, in some embodiments and/or scenarios, cache 140 includes numerous data structures similar to data structure 142, with each corresponding to a different communication segment within the electronic communication documents (e.g., within corpus 136).

In the simple example of FIGS. 3A and 3B, date resolution module 132 might initially process the date field value of "03/04/2006" of segment 202B and determine that the highest-priority resolution gives the date Mar. 4, 2006, with a priority level of 9 (e.g., on a scale of 0 to 10, with 10 being 100% certainty). For example, date resolution module 132 may have determined that the highest-priority resolution occurs by using a date resolution mechanism that inspects nearby communication segments (here, segment 202A), and analyzes the time order of the segments (and utilizes unambiguous dates) to determine the most likely date for an ambiguous date format and value (here, assuming that "03/04/2006" must be Mar. 4, 2006 because the later segment is unambiguously Mar. 5, 2006). Thus, cache update module 134 initially causes data structure 142 to store, in association with a hash or other identifier of the communication segment corresponding to instances 202B, 212A, the date "Mar. 4, 2006" and the priority level "9".

Next, date resolution module 132 might process the date field value of "04/03/2006" of segment 212A, and determine that the highest-priority resolution gives the date Apr. 3, 2006, with a priority level of 2 on the 0 to 10 scale. For example, date resolution module 132 may have determined that the highest-priority resolution occurs by using a date resolution mechanism that, in the absence of other helpful information, simply guesses at the format based on a priori knowledge of how common a particular date format is relative to other formats. Cache update module 134 may compare this new priority level ("3") to the priority level stored in data structure 142 ("9"), and due to the lower value of the new priority level, decide not to update the data structure 142 (i.e., leave the date and priority level currently stored in data structure 142 untouched).

After date resolution module 132 has analyzed the date field values for all instances of the segment associated with date structure 142, and cache update module 134 has updated date structure 142 accordingly throughout the iterative process, date resolution module 132 may use the final date value in date structure 142 as the date to be applied universally to the communication segment (i.e., to all instances of that segment that were identified by segment correspondence module 130). Segment correspondence module 130, date resolution module 132, and cache update module 134 may repeat this process across all unique communication segments in the documents of corpus 136 (or a subset thereof), and then provide the resulting dates to threading unit 122. Threading unit 122 may then use this information, along with other information from parsing unit 124 and/or other units of staging server 106, to arrange the documents (e.g., documents 200, 210, and any other documents being processed) into one or more conversation threads, as discussed above.

Figure 4:
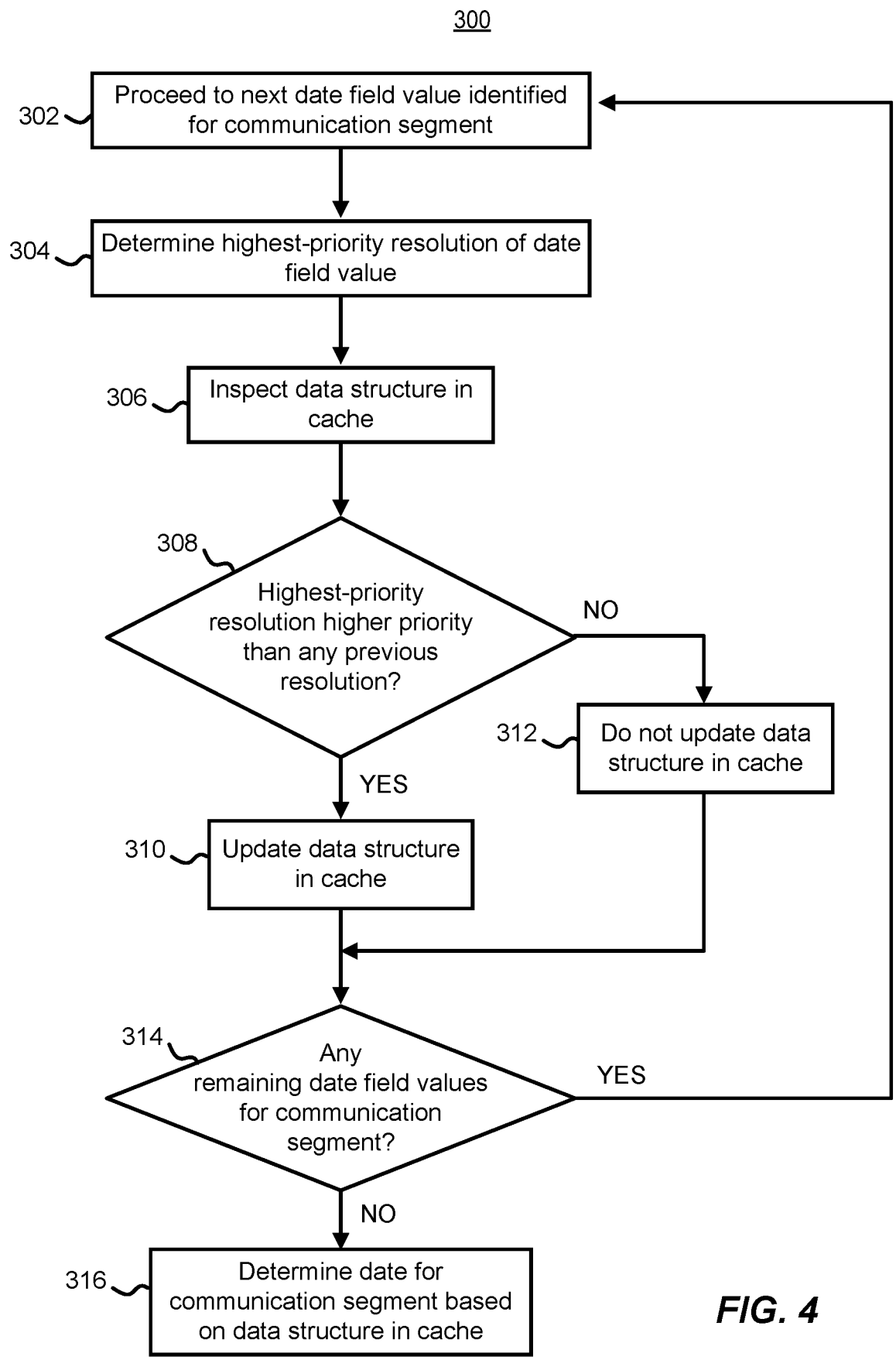
FIG. 4 is a flow diagram of an example algorithm that may be used to resolve date ambiguities in a consistent manner across electronic communication documents.

FIG. 4 depicts one example algorithm 300 that may be implemented by date resolution module 132 and cache update module 134, e.g., after segment correspondence module 130 (or another module of staging server 106) has identified the date field values for all instances of a particular communication segment.

At block 302, the example algorithm 300 proceeds to the next date field value among the date field values identified for the different instances of a single communication segment. It is understood that, for the first date field value processed, block 302 simply involves proceeding to process that first date field value.

At block 304, date resolution module 132 determines the highest-priority resolution of the current date field value, e.g., as discussed above and/or using any of the date resolution mechanisms discussed below.

At block 306, cache update module 134 inspects data structure 142 in cache 140, to determine the priority level in data structure 142, if any, that represents the current highest priority level (e.g., as determined at block 304 for another date field value, in an earlier iteration of the loop shown in FIG. 4). In the first iteration of the loop, block 306 may or may not be skipped, depending on the embodiment.

At block 308, cache update module 134 compares the priority level in data structure 142 (if any) to the priority level of the date resolution determined at block 304. If the latter is higher-priority than the former, flow proceeds to block 310, where cache update module 134 updates data structure 142 by writing the new date and priority level (or other data indicative thereof). If not, flow proceeds to block 312, and data structure 142 is not updated.

In either case, at block 314, date resolution module 132 determines whether any more date field values associated with instances of the communication segment remain to be processed. If not, flow proceeds to block 316, where date resolution module 132 determines the universal date for the communication segment (i.e., across all instances) based on the date stored in data structure 142. If one or more date field values remain, however, flow proceeds back to block 302 to initiate processing of the next date field value. Because each date field value corresponds to a different instance of the segment in a different electronic communication document, each new iteration of blocks 302 through 314 involves the processing of a new date field value of a new document.

Four different exemplary date resolution mechanisms, which may be applied/implemented, for instance, by date resolution module 132, will now be described. These mechanisms are described in descending order, from the highest priority mechanism to the lowest priority mechanism.

1. "Auto" Date Resolution Mechanism

In the "Auto" date resolution mechanism, dates are resolved for entirely unambiguous date field values. This mechanism may involve little or no underlying logic at all, and simply involve simple text matching, for example. In FIG. 3A, for example, the "Auto" mechanism may resolve a date for the date field value "5 Mar. 2006" due to its complete lack of ambiguity, but be unable to resolve a date for the date field value "03/04/2006". While this is termed a "resolution" mechanism for purposes of this disclosure, it is understood that the approach may not actually attempt to resolve any dates.

2. "Analysis" Date Resolution Mechanism

In the "Analysis" date resolution mechanism, dates are resolved by validating various parts of a date field value against a set of rules. For example, this mechanism may apply the following rule set:

Day value must be within 1 to 31 range

Month value must be within 1 to 12 range
Year value must be within range 90 to 99, or 0 to the current year
Year value is always represented with at least two digits
Date may be resolved only with a known format For example, the "Analysis" mechanism may resolve a date of Dec. 28, 2017 for the date field value "12/28/17" because of the three numbers in that value, only the "12" is a valid number for a month value. As another example, the "Analysis" mechanism may resolve a date of Dec. 15, 1999 for the date field value "15-12-99" because 99 can only represent a year and 15 cannot represent a month. As yet another example, the "Analysis" mechanism may resolve a date of Aug. 7, 2009 for the date field value "09-8-7" because the year cannot be represented with a single digit.

3. "Closest Unambiguous" Date Resolution Mechanism

In the "Closest Unambiguous" date resolution mechanism, dates are resolved based on the available unambiguous dates within the same electronic communication document. In particular, the mechanism selects an unambiguous date in the same document, and then finds a resolution of the (ambiguous) date field value that is under consideration that would result in the least time distance between the two dates.

To select an unambiguous date in the same document, this mechanism may first look for the closest communication segment that (1) contains an unambiguous date and (2) is necessarily (due to its ordering within the document) an earlier-written segment than the segment whose date is being resolved (e.g., further down in the conversation thread). If no unambiguous date is found in "earlier" segments then the mechanism may look for the closest unambiguous date, if any exist, among "later" segments in the same document (e.g., further up in the conversation thread).

Also in the "Closest Unambiguous" mechanism, date resolutions may be validated against segments ordering, to avoid cases where the resolved date of the second communication segment in a conversation is earlier than the date of the first communication segment, for example. However, there may be an exception for this validation, if the overlapping is less than or equal to 24 hours. In such cases, this mechanism may assume that the incongruency is caused by time zones shift, and therefore consider the resolution to be valid. In some embodiments, the mechanism only performs the validation against a segment that is being used to resolve the date of a segment under consideration, and other segments in the document are ignored.

In the example of FIG. 3A, the "Closest Unambiguous" mechanism may resolve a date of Mar. 4, 2006 for the date field value "03/04/2006" because Mar. 4, 2006 provides a date nearer to the closest unambiguous date field value ("5 Mar. 2006") than does Apr. 3, 2006.

4. "Closest Synthetic Unambiguous" Date Resolution Mechanism

In the "Closest Synthetic Unambiguous" date resolution mechanism, dates are resolved based on the least time distance between ambiguous dates in a pair of other communication segments in the same electronic communication document. First, the mechanism finds a pair or communication segments in the document that contain different, ambiguous date field values. Second, the mechanism finds the combination of date resolutions for both ambiguous date field values that would provide the least time distance between the two. Third, the mechanism uses that combination of resolved dates to resolve the date field value under consideration by applying the "Closest Unambiguous" date resolution mechanism discussed above.

The mechanism may start the search for the initial pair of dates from the first communication segment in the document (e.g., at the very bottom of the document), and proceeds to the last segment in the conversation (e.g., at the very top of the document). The mechanism considers a particular pair of ambiguous dates to be valid if and only if the respective date field values differ from each other. This avoids another potential ambiguity problem, in which there may be several valid resolutions (e.g., for "02/03/18" and "03-02-18").

The mechanism validates the resolutions for the selected pair of dates against segment ordering, to avoid cases where the resolved date of the second segment in a document is earlier than the date of the first segment in the document, for example. However, there may be an exception for this validation, if the overlapping is less than or equal to 24 hours. In such cases, this mechanism may assume that the incongruency is caused by time zones shift, and therefore consider the resolution to be valid.

Figure 5:
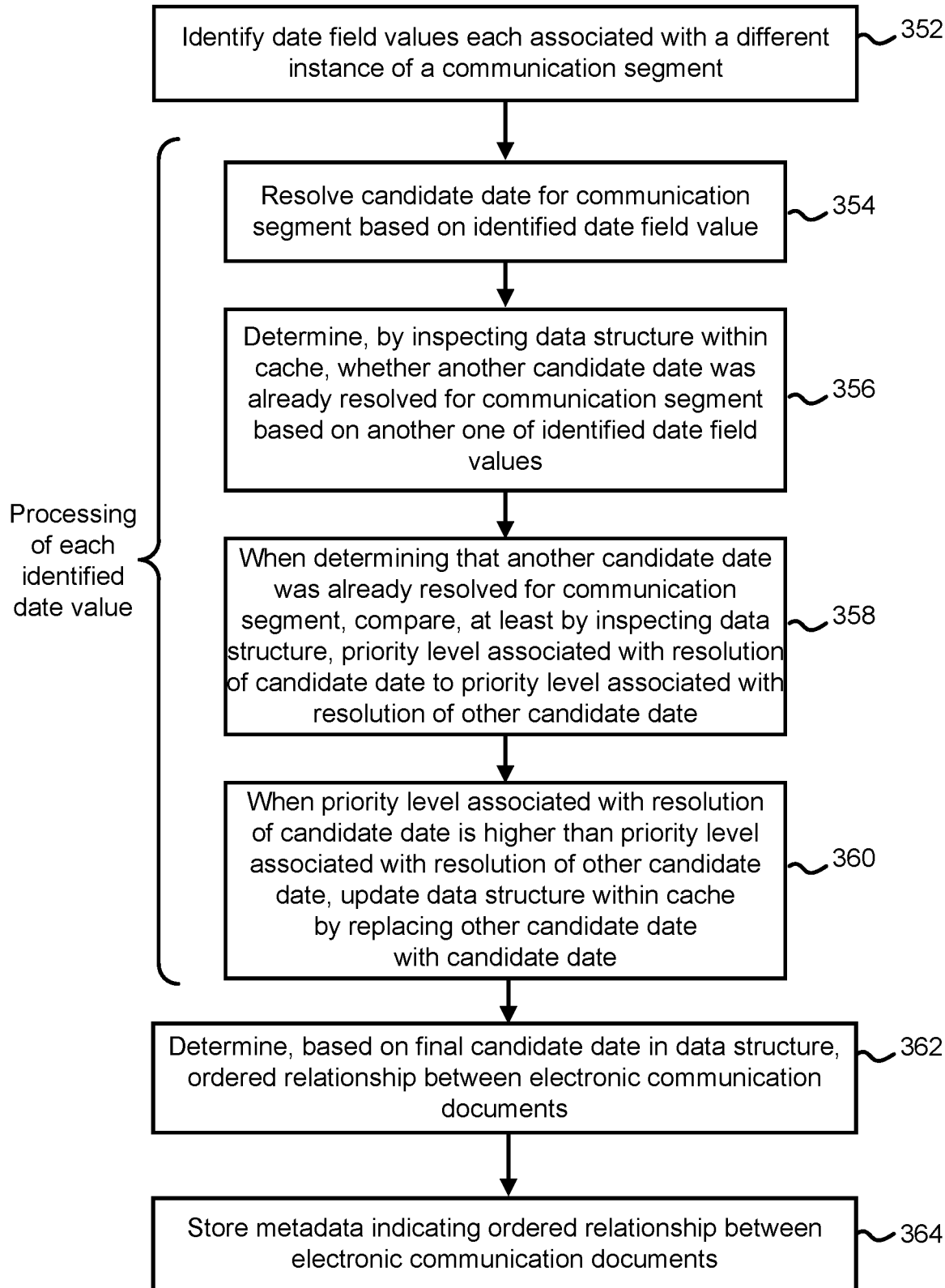
FIG. 5 is a flow diagram depicting an example method that may be used to resolve date ambiguities in a consistent manner across electronic communication documents.

FIG. 5 is a flow diagram of an example method 350 for resolving date ambiguities in electronic communication documents. The method 350 may be implemented by one or more processors of a computing device or system, such as processor 120 of staging server 106 in FIG. 2, for example. For instance, the method 350 may be implemented in part or in full by parsing unit 26, date interpreter 28, and threading unit 24 of FIG. 1, or parsing unit 124, date interpreter 128, and threading unit 122 of FIG. 2.

At block 352 of the method 350, a plurality of date field values, each associated with a different instance of a (same) communication segment, are identified within the electronic communication documents. Each different instance of the communication segment occurs in a different one of the electronic communication documents.

Blocks 354 through 360 correspond to the processing of a given date field value, and may be repeated iteratively for each of at least some of the date field values identified at block 352. Specifically, at block 354, a candidate date is resolved for the communication segment based on the identified date field value. Thereafter, at block 356, it is determined whether another candidate date was already resolved for the communication segment based on another one of the identified date field values. The data structure (e.g., data structure 142) may include the other candidate date. At block 358, if/when determining that another candidate date was already resolved for the communication segment, a priority level associated with the resolution of the candidate date is compared to a priority level associated with the resolution of the other candidate date, at least by inspecting the data structure. At block 360, if/when the priority level associated with the resolution of the candidate date is higher than the priority level associated with the resolution of the other candidate date, the data structure within the cache is updated by replacing the other candidate date with the candidate date.

Next, at block 362, an ordered relationship between the electronic communication documents is determined based (in part) on a final candidate date in the data structure. The ordered relationship may be determined as a part of a conversation threading process implemented by a threading unit (e.g., threading unit 24 of FIG. 1 or threading unit 122 of FIG. 2). Block 362 may also include generating metadata indicating the ordered relationship.

At block 364, the metadata indicating the ordered relationship that was determined at block 362 is stored. For example, the metadata may be stored in a repository of the documents themselves (e.g., communication corpus 136 of FIG. 2), in association with particular electronic communication documents. Alternatively, the metadata may be stored in a different location (e.g., a remote persistent memory). In some embodiments, block 364 is not included in the method 350.

IV. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for resolving date ambiguities in electronic communication documents through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A computer-implemented method for resolving date ambiguities in electronic communication documents, the computer-implemented method comprising:
    identifying, by one or more processors of a computing system and within the electronic communication documents, a plurality of date field values each associated with a different instance of a communication segment, wherein each different instance of the communication segment occurs in a different one of the electronic communication documents;
    processing, by the one or more processors, the identified date field values by, for each of at least some of the identified date field values,
    resolving a candidate date for the communication segment based on the identified date field value,
    determining, by inspecting a data structure within a cache, whether another candidate date was already resolved for the communication segment based on another one of the identified date field values, wherein the data structure includes the other candidate date,
    when determining that another candidate date was already resolved for the communication segment, comparing, at least by inspecting the data structure, a priority level associated with the resolution of the candidate date to a priority level associated with the resolution of the other candidate date, and
    when the priority level associated with the resolution of the candidate date is higher than the priority level associated with the resolution of the other candidate date, updating the data structure within the cache by replacing the other candidate date with the candidate date;
    after processing the identified date field values, determining, by the one or more processors and based on a final candidate date in the data structure, an ordered relationship between the electronic communication documents; and
    storing, by the one or more processors, metadata indicating the ordered relationship between the electronic communication documents.

2. The computer-implemented method of claim 1, wherein resolving the candidate date includes:
    applying one or more of a plurality of available date resolution mechanisms to the identified date field value.

3. The computer-implemented method of claim 2, wherein:
    each of the available date resolution mechanisms is associated with a respective mechanism-specific priority level;
    the priority level associated with the resolution of the candidate date is based at least in part on a mechanism-specific priority level of a first available date resolution mechanism used in the resolution of the candidate date; and the priority level associated with the resolution of the other candidate date is based at least in part on a mechanism-specific priority level of a second available date resolution mechanism used in the resolution of the other candidate date.

4. The computer-implemented method of claim 3, wherein at least some of the available date resolution mechanisms determine which of a plurality of date formats to apply to the identified date field value.

5. The computer-implemented method of claim 3, wherein one of the available date resolution mechanisms resolves dates with substantially 100% certainty for any date field values that can be resolved.

6. The computer-implemented method of claim 5, wherein another one of the available date resolution mechanisms resolves dates with substantially less than 100% certainty for at least some date field values that can be resolved, the other one of the available date resolution mechanisms having a lower mechanism-specific priority level than the one of the available date resolution mechanisms.

7. The computer-implemented method of claim 5, wherein:
another one of the available date resolution mechanisms resolves dates by, for a given date field value in a given communication segment of a given electronic communication document,
(i) identifying which communication segment, of all other communication segments in the given electronic communication document that include an unambiguous date field value, is the fewest number of communication segments away from the given communication segment, and
(ii) resolving a date for the given date field value using a date format that results in a smallest time distance between the date resolved for the given date field value and a date resolved for the unambiguous date field value of the identified communication segment; and
the other one of the available date resolution mechanisms is associated with a lower mechanism-specific priority level than the one of the available date resolution mechanisms.

8. The computer-implemented method of claim 5, wherein:
another one of the available date resolution mechanisms resolves dates by, for a given date field value in a given communication segment of a given electronic communication document,
(i) determining that no communication segments in the given electronic communication document include an unambiguous date field value,
(ii) identifying a first date format that results in a smallest time distance between a first other communication segment of the given electronic communication document and a second other communication segment of the given electronic communication document,
(iii) identifying which communication segment, of the first and second other communication segments, is the fewest number of communication segments away from the given communication segment, and
(iv) resolving a date for the given date field value using a second date format that results in a smallest time distance between (a) the date resolved for the given date field value and (b) a date resolved for the date field value of the identified communication segment using the first date format; and
the other one of the available date resolution mechanisms is associated with a lower mechanism-specific priority level than the one of the available date resolution mechanisms.

9. The computer-implemented method of claim 3, wherein:
the priority level associated with the resolution of the candidate date is further based on how many communication segments are contained in an electronic communication document that includes the identified date field value.

10. The computer-implemented method of claim 3, wherein:
the priority level associated with the resolution of the candidate date is further based on a time-distance between an instance of the communication segment that includes the identified date field value, and an instance of another communication segment in the same electronic communication document.

11. The computer-implemented method of claim 10, wherein:
the instance of the other communication segment includes an unambiguous date field value.

12. The computer-implemented method of claim 1, wherein identifying the plurality of date field values each associated with a different instance of the communication segment includes:
generating a separate hash for all communication segments within the electronic communication documents; and
comparing the generated hashes to identify all instances of the communication segment.

13. The computer-implemented method of claim 12, wherein the data structure includes the hash generated for the communication segment.

14. The computer-implemented method of claim 1, wherein each of the plurality of date field values is included in a respective embedded header.

15. A non-transitory computer-readable medium storing instructions that, when executed by one or more processors of a computing system, cause the computing system to:
identify, within electronic communication documents, a plurality of date field values each associated with a different instance of a communication segment, wherein each different instance of the communication segment occurs in a different one of the electronic communication documents;
process the identified date field values by, for each of the identified date field values,
resolving a candidate date for the communication segment based on the identified date field value,
determining, by inspecting a data structure within a cache, whether another candidate date was already resolved for the communication segment based on another one of the identified date field values, wherein the data structure includes the other candidate date,
when determining that another candidate date was already resolved for the communication segment, comparing, at least by inspecting the data structure, a priority level associated with the resolution of the candidate date to a priority level associated with the resolution of the other candidate date, and
when the priority level associated with the resolution of the candidate date is higher than the priority level associated with the resolution of the other candidate date, updating the data structure within the cache by replacing the other candidate date with the candidate date;

after processing the identified date field values, determine, based on a final candidate date in the data structure, an ordered relationship between the electronic communication documents; and store metadata indicating the ordered relationship between the electronic communication documents.

16. The non-transitory computer-readable medium of claim 15, wherein the instructions cause the computing system to resolve the candidate date by applying one or more of a plurality of available date resolution mechanisms to the identified date field value.

17. The non-transitory computer-readable medium of claim 16, wherein:

each of the available date resolution mechanisms is associated with a respective mechanism-specific priority level;

the priority level associated with the resolution of the candidate date is based at least in part on a mechanism-specific priority level of a first one of the available date resolution mechanisms used in the resolution of the candidate date; and the priority level associated with the resolution of the other candidate date is based at least in part on a mechanism-specific priority level of a second one of the available date resolution mechanisms used in the resolution of the other candidate date.

18. The non-transitory computer-readable medium of claim 17, wherein at least some of the available date resolution mechanisms determine which of a plurality of date formats to apply to the identified date field value.

19. The non-transitory computer-readable medium of claim 17, wherein one of the available date resolution mechanisms resolves dates with substantially 100% certainty for any date field values that can be resolved.

20. The non-transitory computer-readable medium of claim 19, wherein another one of the available date resolution mechanisms resolves dates with substantially less than 100% certainty for at least some date field values that can be resolved, the other one of the available date resolution mechanisms having a lower mechanism-specific priority level than the one of the available date resolution mechanisms.

* * * * *